United States Patent
Kamio

(10) Patent No.: US 10,680,542 B2
(45) Date of Patent: Jun. 9, 2020

(54) SHIFT RANGE CONTROL DEVICE

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/322,981

(22) PCT Filed: Sep. 7, 2017

(86) PCT No.: PCT/JP2017/032361
§ 371 (c)(1),
(2) Date: Feb. 4, 2019

(87) PCT Pub. No.: WO2018/047921
PCT Pub. Date: Mar. 15, 2018

(65) Prior Publication Data
US 2019/0190411 A1 Jun. 20, 2019

(30) Foreign Application Priority Data
Sep. 9, 2016 (JP) .................................. 2016-176278

(51) Int. Cl.
F16H 61/32 (2006.01)
H02P 6/15 (2016.01)
H02P 27/06 (2006.01)
H02P 29/20 (2016.01)
H02P 6/28 (2016.01)
(Continued)

(52) U.S. Cl.
CPC ............ *H02P 6/153* (2016.02); *F16H 61/32* (2013.01); *H02P 6/24* (2013.01); *H02P 6/28* (2016.02); *H02P 27/06* (2013.01); *H02P 29/20* (2016.02); *H02P 29/64* (2016.02); *F16H 59/64* (2013.01);
(Continued)

(58) Field of Classification Search
None
See application file for complete search history.

(56) References Cited

U.S. PATENT DOCUMENTS

2004/0008002 A1 1/2004 Kamio et al.
2005/0066759 A1 3/2005 Hirota et al.
(Continued)

FOREIGN PATENT DOCUMENTS

JP 3-107384 5/1991
JP 2001-242904 9/2001
(Continued)

*Primary Examiner* — Justin Holmes
(74) *Attorney, Agent, or Firm* — Nixon & Vanderhye P.C.

(57) ABSTRACT

A shift range control device, mounted on a vehicle for switching a shift range by controlling a driving operation of a motor, includes: feedback controller; a feedback value setting unit; a current sensor; and a current correction unit. The feedback controller performs a feedback control based on an actual angle of the motor and a motor speed as a rotational speed of the motor. The feedback value setting unit sets a feedback value of the motor speed to advance a phase of the motor speed, based on the motor speed. The current sensor detects a motor current which flows through the motor. The current correction unit estimates a temperature of the motor based on the motor current, and corrects a target motor speed which is a target speed of the motor determined based on a request shift range.

5 Claims, 15 Drawing Sheets

(51) Int. Cl.
  *H02P 29/64* (2016.01)
  *H02P 6/24* (2006.01)
  *F16H 59/64* (2006.01)
  *F16H 59/72* (2006.01)
  *F16H 59/78* (2006.01)

(52) U.S. Cl.
  CPC .............. *F16H 59/72* (2013.01); *F16H 59/78* (2013.01); *F16H 2061/326* (2013.01)

(56) References Cited

U.S. PATENT DOCUMENTS

| | | |
|---|---|---|
| 2005/0174084 A1 | 8/2005 | Nakai et al. |
| 2006/0108966 A1 | 5/2006 | Kamio et al. |
| 2009/0091284 A1 | 4/2009 | Isobe et al. |
| 2015/0222211 A1 | 8/2015 | Maruo et al. |
| 2016/0276975 A1* | 9/2016 | Fujishima ............. H02P 29/685 |
| 2017/0111000 A1* | 4/2017 | Saito ....................... H02P 29/60 |

FOREIGN PATENT DOCUMENTS

| | | |
|---|---|---|
| JP | 2004-19804 | 1/2004 |
| JP | 4189953 | 12/2008 |
| JP | 2012-184079 | 9/2012 |

* cited by examiner

SHIFT RANGE CONTROL DEVICE

CROSS REFERENCE TO RELATED APPLICATION

This application is the U.S. national phase of International Application No. PCT/JP2017/032361 filed Sep. 7, 2017 which designated the U.S. and claims priority to Japanese Patent Application No. 2016-176278 filed on Sep. 9, 2016, the entire contents of each of which are incorporated herein by reference.

TECHNICAL FIELD

The present disclosure relates to a shift range control device.

BACKGROUND ART

Up to now, a shift range switching device has been known which switches a shift range by controlling a motor in response to a shift range switching request from a driver. In Patent Literature 1, a switched reluctance motor is used as a driving source of a shift range switching mechanism. Hereinafter, the switched reluctance motor is referred to as an "SR motor".

PRIOR ART LITERATURES

Patent Literature

Patent Literature 1: Japanese Patent No. 4385768

SUMMARY

An SR motor that does not use a permanent magnet has a simple configuration. In addition, a motor using a permanent magnet such as a DC brushless motor has an excellent response as compared with the SR motor.

When the motor is used in a high temperature environment, a coil resistance of the motor is large, a flowing current is small, a braking force is lowered, and an actual angle of the motor is liable to overshoot. On the other hand, when a motor is used in a low temperature environment, a friction due to driving of the motor increases, and a responsiveness deteriorates.

It is an object of the present disclosure to provide a shift range control device capable of optimally controlling driving of a motor involved in switching of a shift range according to a temperature.

A shift range control device according to the present disclosure is mounted on a vehicle, switches a shift range by controlling driving of the motor, and includes a feedback control unit, a feedback value setting unit, a current sensor, and a current correction unit.

The feedback controller performs a feedback control based on an actual angle of the motor and a motor speed which is a rotational speed of the motor.

The feedback value setting unit sets a feedback value of the motor speed to advance a phase of the motor speed, based on the motor speed.

The current sensor detects a motor current which flows through the motor.

The current correction unit estimates a temperature of the motor based on the motor current, and corrects a target motor speed which is a target speed of the motor determined based on a request shift range.

Since the current correction unit estimates the temperature of the motor and corrects a target motor speed, a braking timing of the motor can be advanced and overshoot can be prevented in a high temperature environment. Further, in a low temperature environment, the braking timing of the motor can be delayed, and an actual angle of the motor can be easily set to a target value. This makes it possible to optimally control the driving of the motor involved in the switching of the shift range according to the temperature.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, a shift range control device will be described with reference to the drawings.

First, a shift-by-wire system 1 in which a shift range control device 40 is used will be described.

The shift-by-wire system 1 is mounted on a vehicle.

Although not shown, the vehicle is equipped with an engine, a radiator, a liquid temperature sensor, an oil temperature sensor, and an outside air temperature sensor.

A high-temperature coolant is sent to the radiator through a water jacket and an upper hose, which are paths of the coolant in the engine, and the coolant is cooled by a traveling wind caused by traveling of the vehicle.

The radiator also cools a hot coolant and returns the cooled coolant to the engine through a lower hose.

The coolant contains an antifreeze mixed with water, and a long life coolant also having an anti-corrosive effect is used as the antifreeze.

The liquid temperature sensor is connected to an upper hose, and is capable of measuring a coolant temperature Hc [° C.], which is a temperature of the coolant flowing through the upper hose.

The oil temperature sensor can measure an oil temperature Ho[° C.], which is a temperature of an engine oil, a transmission oil or the like used in an automatic transmission 5 to be described later.

The outside air temperature sensor can detect an outside air temperature Ha[° C.], which is a temperature of an outside air outside the vehicle.

As the liquid temperature sensor, the oil temperature sensor, and the outside air temperature sensor, for example, a thermistor which is a ceramic semiconductor whose electric resistance changes in accordance with the temperature is used.

Figure 1:
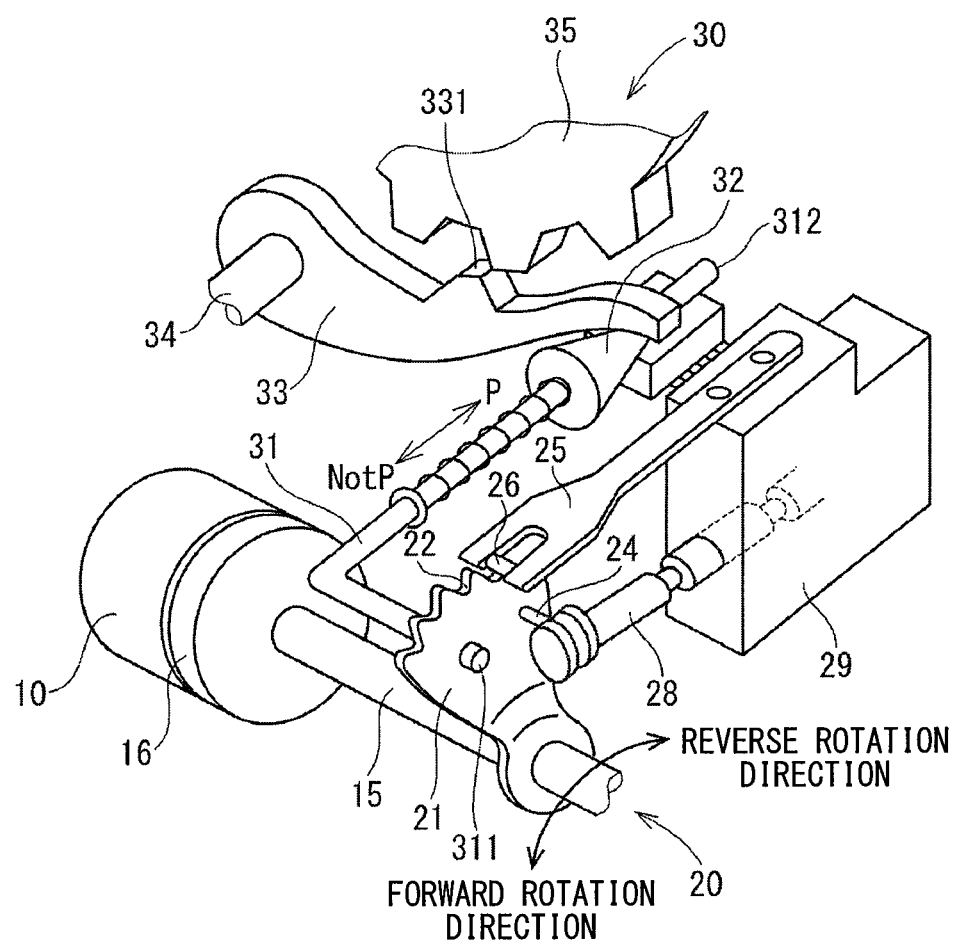
FIG. 1 is a perspective view of a shift-by-wire system according to an embodiment.
Figure 2:
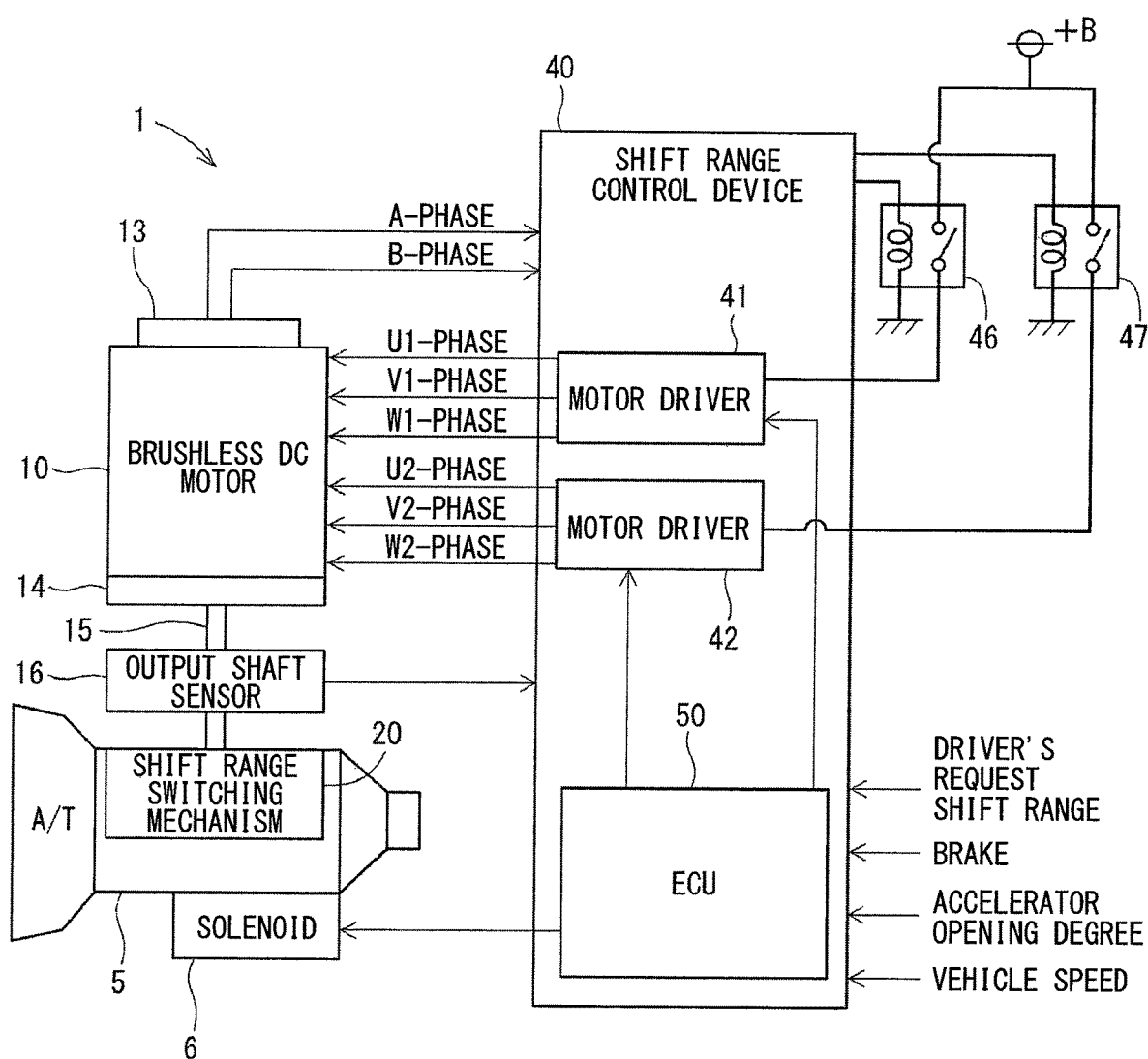
FIG. 2 is a configuration diagram of the shift-by-wire system according to the embodiment.

As shown in FIGS. 1 and 2, the shift-by-wire system 1 includes a motor 10, a shift range switching mechanism 20, a parking lock mechanism 30, and a shift range control device 40.

When an electric power is supplied from a battery 45 mounted on the vehicle, the motor 10 rotates and functions as a driving source of the shift range switching mechanism 20.

Further, the motor 10 can change a magnitude of the current by a feedback control, and can change a command for each phase.

Figure 3:
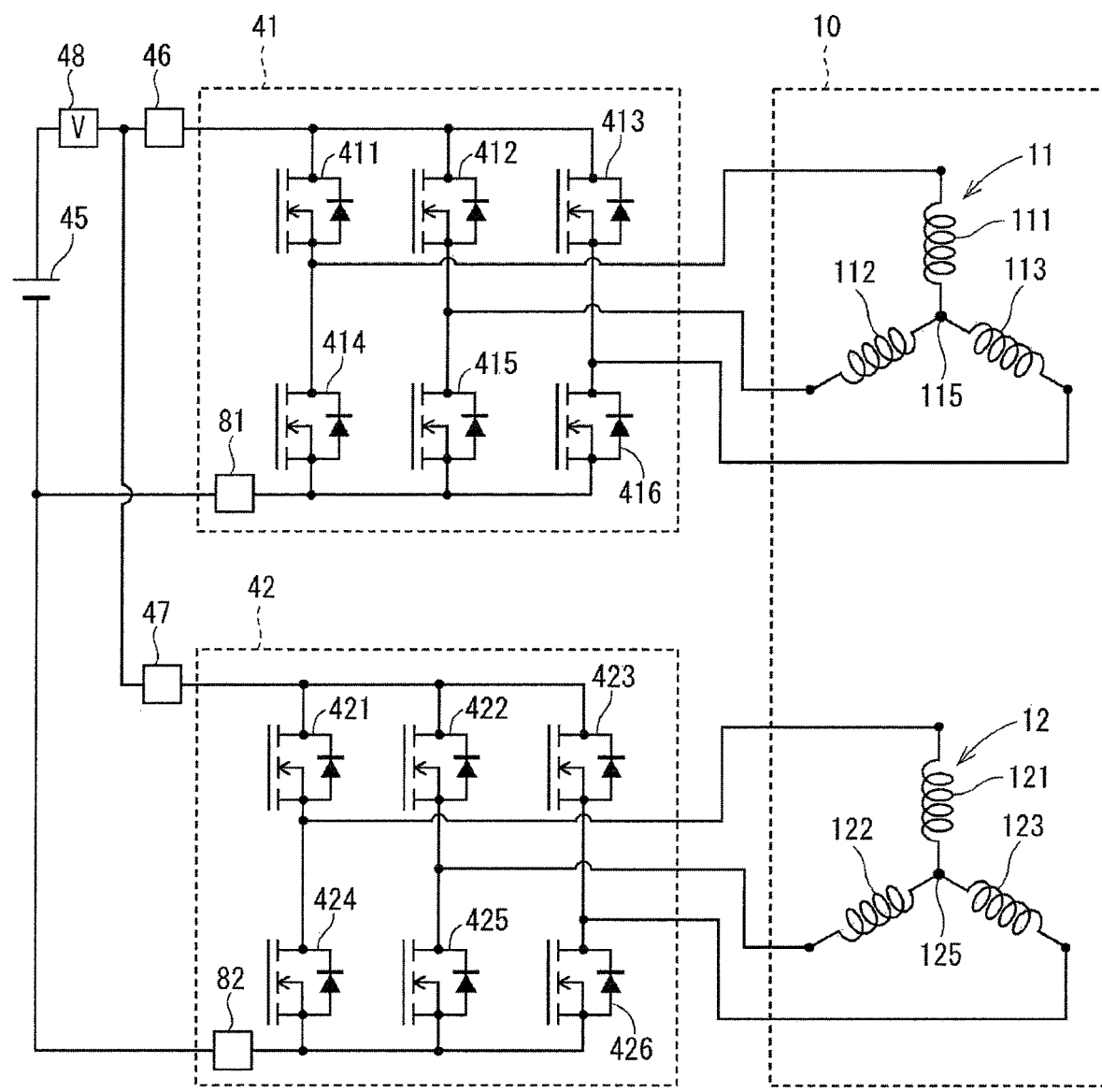
FIG. 3 is a circuit diagram illustrating a motor and a motor driver according to the embodiment.

As shown in FIG. 3, the motor 10 has two sets of winding sets, that is, a first winding set 11 and a second winding set 12.

The first winding set 11 includes a U1 coil 111, a V1 coil 112, and a W1 coil 113.

The second winding set 12 includes a U2 coil 121, a V2 coil 122, and a W2 coil 123.

Returning to FIG. 2, the motor 10 is a DC brushless motor of a permanent magnet type, and includes an encoder 13 and a speed reducer 14.

The encoder 13 can detect a rotational position of a rotor of the motor 10.

The encoder 13 is, for example, a magnetic rotary encoder, and is configured by a magnet rotating integrally with the rotor and a Hall IC for magnetic detection.

Further, the encoder 13 outputs pulse signals of an A-phase and a B-phase at every predetermined angle in synchronization with the rotation of the rotor.

The speed reducer 14 is provided between a motor shaft of the motor 10 and an output shaft 15, decelerates the rotation of the motor 10, and outputs the decelerated rotation to the output shaft 15. As a result, the rotation of the motor 10 is transmitted to the shift range switching mechanism 20.

The output shaft 15 includes an output shaft sensor 16.

The output shaft sensor 16 is, for example, a potentiometer, and detects an angle of the output shaft 15.

Returning to FIG. 1, the shift range switching mechanism 20 includes a detent plate 21 and a detent spring 25, converts a rotational motion of the motor 10 into a linear motion, and transmits the linear motion to a manual valve 28.

The detent plate 21 is fixed to the output shaft 15 and rotated by the motor 10. It is assumed that a direction in which the detent plate 21 is away from a base of the detent spring 25 is a forward rotation direction and a direction in which the detent template 21 comes closer to the base portion is a reverse rotation direction.

The detent plate 21 includes four recess portions 22 and a pin 24.

The recess portion 22 are provided on the detent spring 25 side of the detent plate 21, and hold the manual valve 28 at a position corresponding to each range.

The recess portions 22 correspond to each range of D, N, R, and P from the base portion side of the detent spring 25. The D range is a forward range, the N range is a neutral range, the R range is a reverse range, and the P range is a parking range.

The pin 24 projects in parallel to the output shaft 15 and is connected to the manual valve 28.

The manual valve 28 is provided in a valve body 29, and reciprocates in an axial direction when the detent plate 21 is rotated by the motor 10. When the manual valve 28 reciprocates in the axial direction, a hydraulic supply path to a hydraulic clutch is switched, and an engagement state of the hydraulic clutch is switched, to thereby change the shift range.

The detent spring 25 is an elastically deformable plate-like member, and a detent roller 26 that fits into one of the recess portions 22 is provided at a tip end of the detent spring 25.

The detent spring 25 urges the detent roller 26 toward a rotation center side of the detent plate 21. When a predetermined rotational force or more is applied to the detent plate 21, the detent spring 25 is elastically deformed, and the detent roller 26 moves in the recess portions 22. The detent roller 26 fits into one of the recess portions 22, to thereby regulate swing of the detent plate 21. As a result, an axial position of the manual valve 28 and a state of the parking lock mechanism 30 are determined, and the shift range of the automatic transmission 5 is fixed.

The parking lock mechanism 30 includes a parking rod 31, a conical body 32, a parking lock pawl 33, a shaft portion 34, and a parking gear 35.

The parking rod 31 is formed in an L-shape, and one end 311 of the parking rod 31 is fixed to the detent plate 21.

The other end 312 of the parking rod 31 is provided with the conical body 32.

A diameter of the conical body 32 decreases toward the other end 312. When the detent plate 21 swings in the reverse rotation direction, the conical body 32 moves in a direction indicated by an arrow P.

The parking lock pawl 33 contacts a conical surface of the conical body 32 and is provided so as to be swingable about the shaft portion 34.

The parking lock pawl 33 includes a protrusion portion 331 on the parking gear 35 side.

The protrusion portion 331 can mesh with the parking gear 35.

When the detent plate 21 rotates in the reverse rotation direction and the conical body 32 moves in a direction indicated by an arrow P, the parking lock pawl 33 is pushed up by the conical body 32 and the protrusion portion 331 meshes with the parking gear 35.

On the other hand, when the detent plate 21 rotates in the forward rotational direction and the conical body 32 moves in a direction indicated by an arrow notP, the protrusion portion 331 is disengaged from the parking gear 35.

When the parking gear 35 meshes with the protrusion portion 331, the rotation of an axle is restricted.

The parking gear 35 is not locked by the parking lock pawl 33 when the shift range is a notP range other than the P range. At that time, the rotation of the axle is not hindered by the parking lock mechanism 30.

On the other hand, when the shift range is the P range, the parking gear 35 is locked by the parking lock pawl 33, and the rotation of the axle is regulated.

Embodiment

Hereinafter, the shift range control device 40 will be described.

As shown in FIGS. 2 and 3, the shift range control device 40 includes motor drivers 41 and 42, motor relays 46 and 47, a voltage sensor 48, and an ECU 50.

The motor driver 41 is a three-phase inverter for switching the energization of the first winding set 11 in which switching elements 411 to 416 are bridge-connected to each other.

One end of the U1 coil 111 is connected to a connection point between the U-phase switching elements 411 and 414 that are paired with each other. One end of the V1 coil 112 is connected to a connection point between the V-phase switching elements 412 and 415 that are paired with each other. One end of the W1 coil 113 is connected to a connection point between the W-phase switching elements 413 and 416 that are paired with each other.

The other ends of the coils 111 to 113 are connected to each other by a connection portion 115.

The motor driver 42 is a three-phase inverter for switching the energization of the second winding set 12 in which switching elements 421 to 426 are bridge-connected to each other.

One end of the U2 coil 121 is connected to a connection point between the U-phase switching elements 421 and 424 that are paired with each other. One end of the V2 coil 122 is connected to a connection point between the V-phase switching elements 422 and 425 that are paired with each other. One end of the W2 coil 123 is connected to a connection point between the W-phase switching elements 423 and 426 that are paired with each other.

The other ends of the coils 121 to 123 are connected to each other by a connecting portion 125.

The switching elements 411 to 416 and 421 to 426 are each formed of a MOSFET, but may be formed of other elements such as an IGBT.

The motor drivers 41 and 42 are provided with current sensors 81 and 82 capable of detecting a motor current Im, which is a current flowing through the motor 10, respectively. The current sensors 81 and 82 may be provided on a high potential side or a low potential side of the battery 45.

The current sensors 81 and 82 are configured by, for example, shunt resistors or Hall ICs, and output a motor current Im to a current correction unit 84 and a PWM signal generation unit 69 in a feedback control unit 60, which will be described later.

The motor relay 46 is provided between the motor driver 41 and the battery 45.

The motor relay 47 is provided between the motor driver 42 and the battery 45.

The motor relays 46 and 47 are turned on when a start switch such as an ignition switch is turned on, and the electric power is supplied to the motor 10 side.

On the other hand, the motor relays 46 and 47 are turned off when the start switch is off, and the supply of the electric power to the motor 10 side is cut off.

The voltage sensor 48 is provided on the high potential side of the battery 45, and can detect a battery voltage V.

The ECU 50 controls the motor 10 by controlling on/off operations of the switching elements 411 to 416 and 421 to 426. One set of ON and OFF is defined as a switching period, and a rate of an ON time to the switching period is defined as a duty.

The ECU 50 controls the driving of shift hydraulic control solenoids 6 based on a vehicle speed, an accelerator opening degree, a driver's request shift range, and the like. A shift stage is controlled by controlling the shift hydraulic control solenoids 6.

The shift hydraulic control solenoids 6 of the number corresponding to the number of transmission stages and the like are provided.

In the present embodiment, one ECU 50 controls the driving of the motor 10 and the shift hydraulic control solenoids 6. A motor ECU for motor control for controlling the motor 10 and an AT-ECU for solenoid control may be separated from each other.

Up to now, a shift range switching device has been known which switches a shift range by controlling a motor in response to a shift range switching request from a driver. In Patent Literature 1, an SR motor is used as a driving source of the shift range switching mechanism.

An SR motor that does not use a permanent magnet has a simple configuration. In addition, a motor using a permanent magnet such as a DC brushless motor has an excellent response as compared with the SR motor.

When the motor is used in a high temperature environment, a coil resistance of the motor is large, a flowing current is small, a braking force is lowered, and an actual angle of the motor is liable to overshoot. On the other hand, when a motor is used in a low temperature environment, a friction due to driving of the motor increases, and a responsiveness deteriorates.

Therefore, the shift range control device 40 according to the present embodiment can optimally control the driving of the motor involved in the switching of the shift range in accordance with the temperature.

Figure 4:
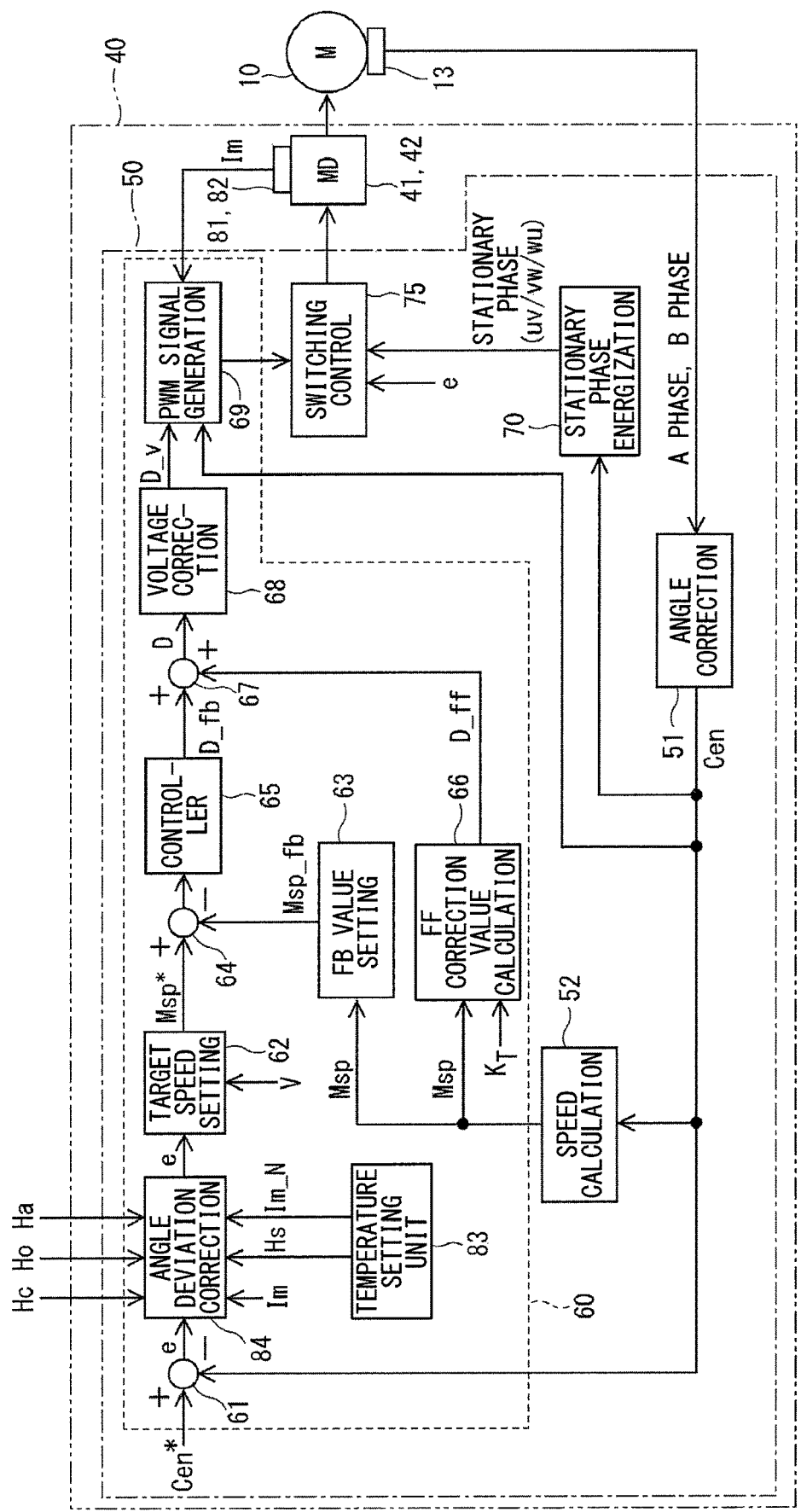
FIG. 4 is a block diagram illustrating a shift range control device according to the embodiment.

As shown in FIG. 4, the ECU 50 of the shift range control device 40 includes an angle computation unit 51, a speed computation unit 52, a feedback control unit 60, a stationary phase energization control unit 70, and a switching control unit 75.

The ECU 50 is mainly configured by a microcomputer or the like.

The processing in the ECU 50 may be software processing by executing a CPU to execute programs stored in advance in tangible memories such as ROMs, or hardware processing by dedicated electronic circuits.

The angle computation unit 51 calculates an actual count value Cen, which is a count value of the encoder 13, based on pulses of the A-phase and the B-phase output from the encoder 13.

The actual count value Cen is a value corresponding to an actual mechanical angle and an electric angle of the motor 10. In the present embodiment, the actual count value Cen is set as the "actual angle".

The angle computation unit 51 outputs the actual count value Cen to the speed computation unit 52, the angle deviation computation unit 61 and the PWM signal generation unit 69 of the feedback control unit 60, and the stationary phase energization control unit 70.

The speed computation unit 52 calculates a motor speed Msp, which is the rotation speed of the motor 10, based on the actual count value Cen.

The speed computation unit 52 outputs the calculated motor speed Msp to an FB value setting unit 63 and a feed-forward term correction unit 67 in the feedback control unit 60.

The feedback control unit 60 performs a feedback control by feeding back the actual count value Cen and the motor speed Msp.

The feedback control unit 60 includes an angle deviation computation unit 61, a temperature setting unit 83, a current correction unit 84, a target speed setting unit 62, and the feedback value setting unit 63.

The feedback control unit 60 further includes a speed deviation computation unit 64, a controller 65, a feed-forward correction value computation unit 66, the feed-forward term correction unit 67, a voltage correction unit 68, and the PWM signal generation unit 69. Hereinafter, the feedback is referred to as "FB" and the feed-forward is referred to as "FF" as appropriate.

The angle deviation computation unit 61 feeds back the actual count value Cen.

A target angle of the motor 10 determined based on the driver's request shift range input by the operation of the shift lever is set as a target count value Cen*. An absolute value of a difference between the target count value Cen* and the actual count value Cen is defined as an angle deviation e.

The angle deviation computation unit 61 calculates the angle deviation e, and outputs the calculated angle deviation e to the current correction unit 84.

It is assumed that a preset temperature is a set temperature Hs, and the motor current Im set based on a set temperature Hs is a normalized motor current Im_N.

The temperature setting unit 83 stores the set temperature Hs and the normalized motor current Im_N, and outputs the set temperature Hs and the normalized motor current Im_N to the current correction unit 84.

The set temperature Hs is, for example, a normal temperature, and is a temperature when shipped from a factory whose temperature is controlled in a range of 20° C. to 30° C.

Figure 5:
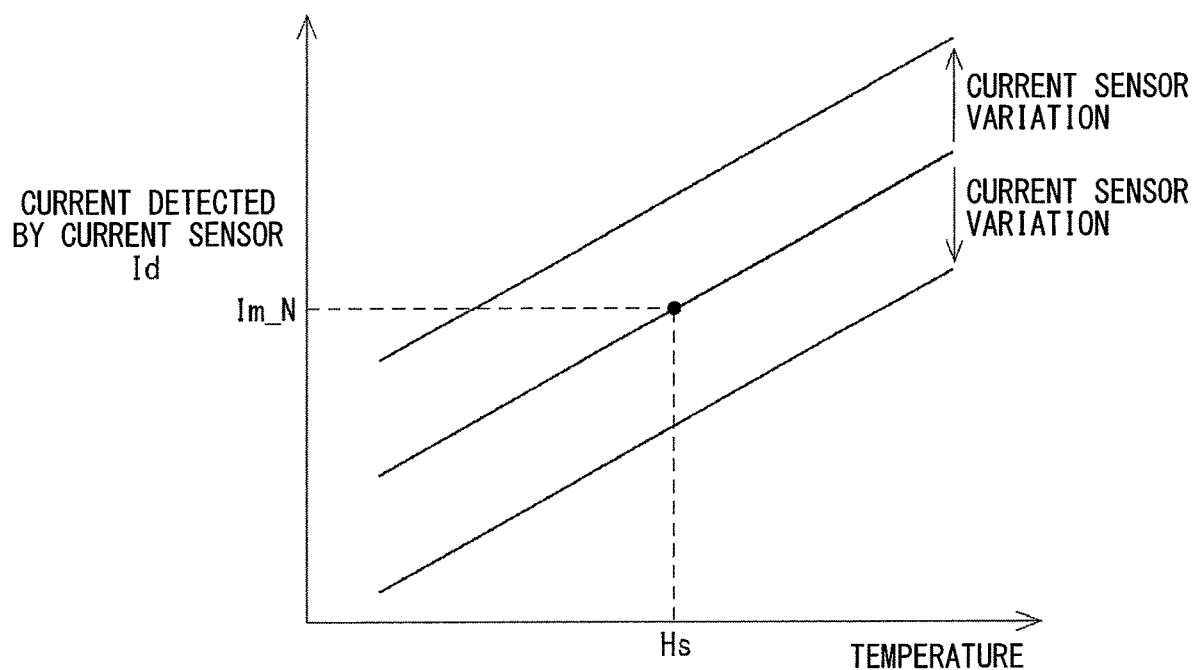
FIG. 5 is a diagram illustrating a relationship between a set temperature of the shift range control device and a normalized motor current according to the embodiment.

As shown in FIG. 5, generally, as the current detected by the current sensors 81 and 82, a detection current Id changes in accordance with a temperature change in the current sensors 81 and 82. Further, the detection current Id varies due to product variations of the current sensors 81 and 82.

The normalized motor current Im_N is a value determined at one point as the motor current Im at the set temperature Hs.

The current correction unit 84 calculates a temperature correction coefficient KT according to the acquired motor current Im based on the coolant temperature Hc, the oil temperature Ho, and the outside air temperature Ha.

The current correction unit 84 sets the motor current Im to the normalized motor current Im_N when a speed state of the motor 10, which will be described later, is an acceleration state and the set temperature Hs, the coolant temperature Hc, and the outside air temperature Ha coincide with each other, or when the set temperature Hs, the oil temperature Ho, and the outside air temperature Ha coincide with each other. In this example, the "coincidence" is not perfect coincidence, and the "coincidence" also includes a common sense error range.

The current correction unit 84 outputs the temperature correction coefficient KT to the feed-forward correction value computation unit 66, which will be described later.

The temperature correction coefficient KT is represented by, for example, the following Relational Expression (1).

With calculation of temperature correction coefficient KT from the acquired motor current Im, a motor temperature Hm, which is the temperature of the motor 10, is estimated.

$$KT = Im/Im\_N \qquad (1)$$

Figure 6:
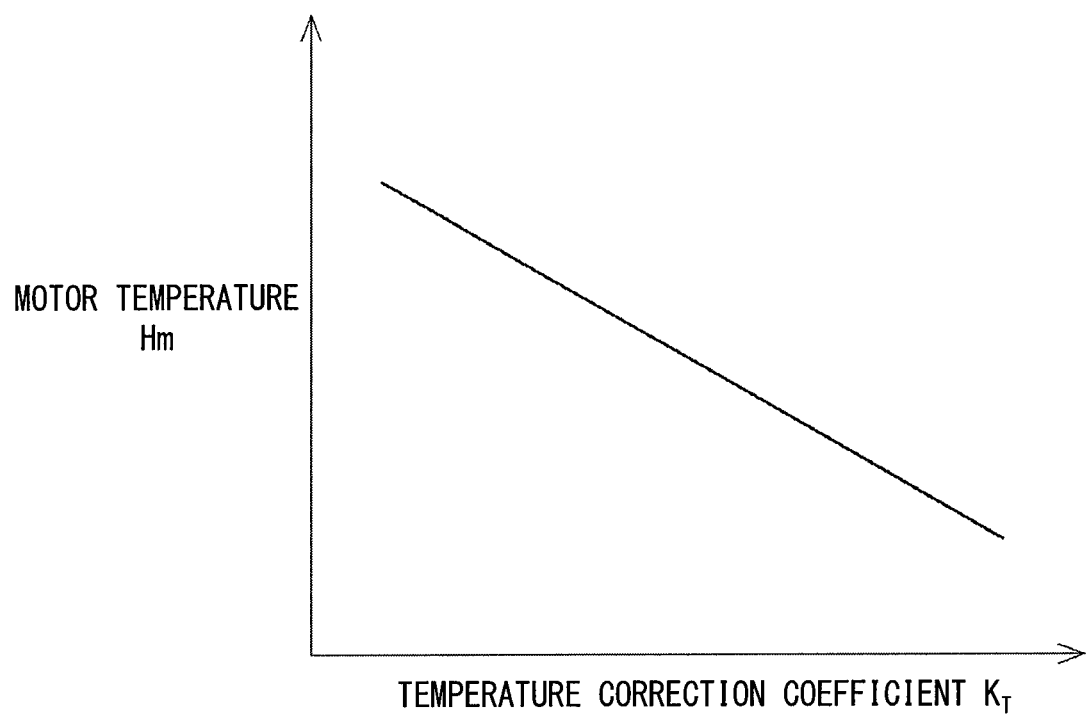
FIG. 6 is a diagram showing a relationship between a temperature correction coefficient and a motor temperature of the shift range control device according to the embodiment.

As shown in FIG. 6, the current correction unit 84 estimates that the motor temperature Hm decreases as the temperature correction coefficient KT increases.

Resistances of the coils 111 to 113 and 121 to 123 are referred to as a coil resistance Rc.

When the temperature correction coefficient KT increases, the motor current Im increases as compared with the normalized motor current Im_N. The motor current Im easily flows, and the coil resistance Rc is reduced. Since the resistances of the coils 111 to 113 and 121 to 123 are reduced, it is estimated that the motor temperature Hm decreases.

Further, the current correction unit 84 corrects the angle deviation e based on the temperature correction coefficient KT. The target motor speed Msp* is corrected by the current correction unit 84 correcting the angle deviation e.

Figure 7:
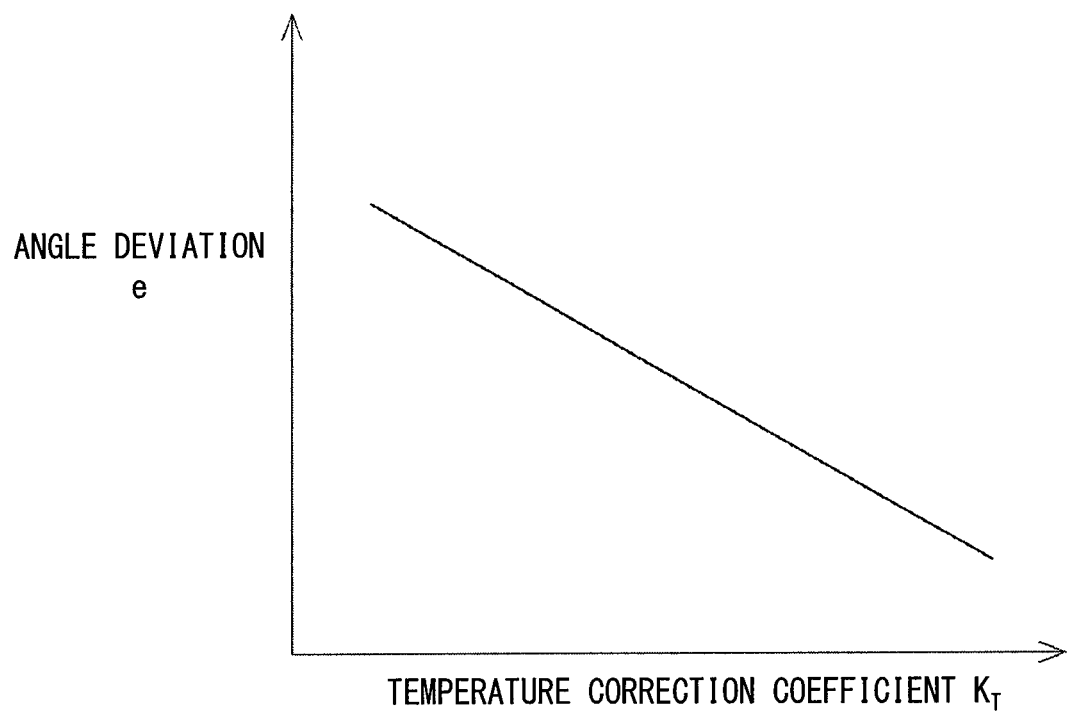
FIG. 7 is a diagram illustrating a relationship between a temperature correction coefficient and an angle deviation of the shift range control device according to the embodiment.

As shown in FIG. 7, as the temperature correction coefficient KT increases, the current correction unit 84 corrects the angle deviation e so that the angle deviation e decreases. The current correction unit 84 outputs the corrected angle deviation e to the target speed setting unit 62.

The target speed setting unit 62 sets a target motor speed Msp*, which is a target speed of the motor 10, based on the angle deviation e.

The target speed setting unit 62 outputs the set target motor speed Msp* to the speed deviation computation unit 64.

Figure 8:
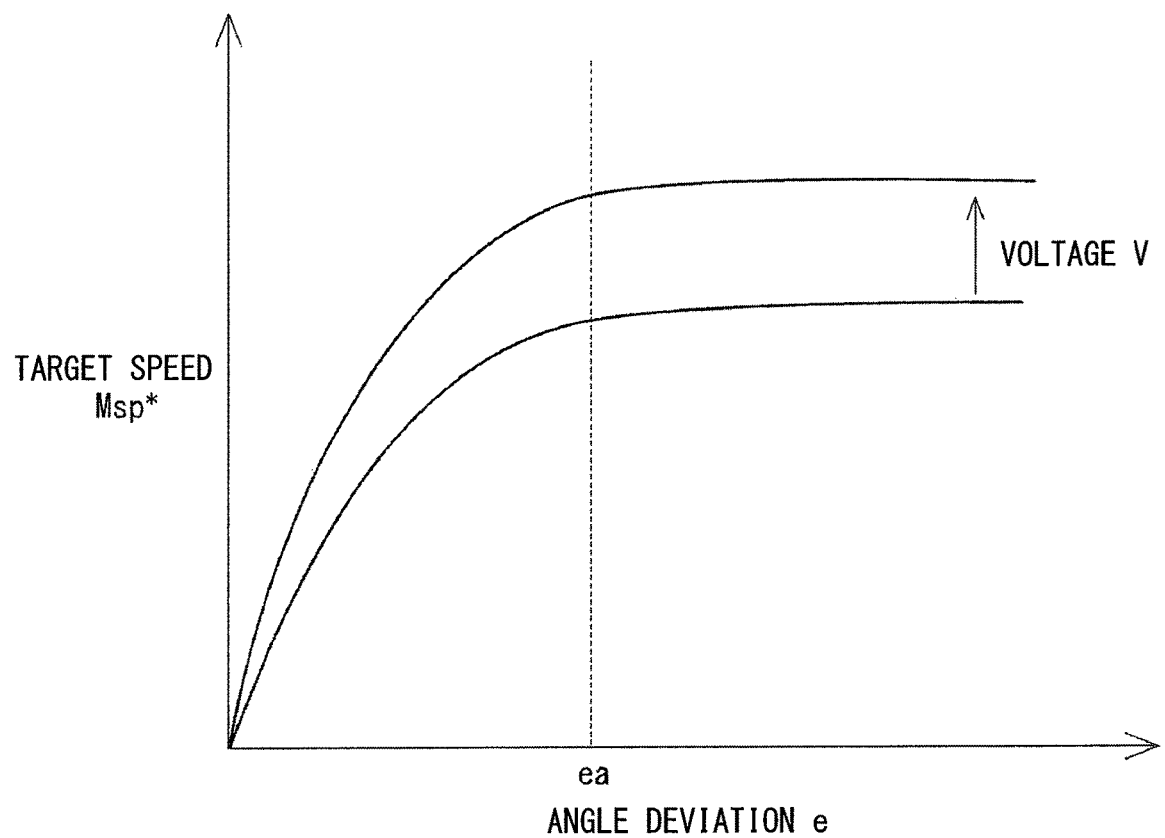
FIG. 8 is a diagram showing a relationship between an angle deviation and a target motor speed in the shift range control device according to the embodiment.

As shown in FIG. 8, the target motor speed Msp* is set to increase as the angle deviation e increases when the angle deviation e is equal to or less than a predetermined value ea based on a relationship diagram or the like. When the angle deviation e is more than the predetermined value ea, the target motor speed Msp* is set to a predetermined maximum value.

Further, the target motor speed Msp* is set to increase as the battery voltage V increases.

The FB value setting unit 63 sets a speed feedback value Msp_fb to be fed back based on the speed state of the motor 10, and outputs the speed feedback value Msp_fb to the speed deviation computation unit 64.

A differential value of the motor speed Msp is set as a speed differential value dp_Msp, and a differential value of the target motor speed Msp* is set as a target speed differential value dp_Msp*.

A current value of the motor speed Msp is set as a current motor speed Msp(n), and a previous value of the motor speed Msp is set as a previous motor speed Msp(n−1).

A current value of the target motor speed Msp* is set as a current target motor speed Msp*(n), and a previous value of the target motor speed Msp* is set as a previous target motor speed Msp*(n−1).

The speed differential value dp_Msp is calculated, for example, by subtracting the previous motor speed Msp(n−1) from the current motor speed Msp(n).

The target speed differential value dp_Msp* is calculated, for example, by subtracting the previous target motor speed Msp*(n−1) from the current target motor speed Msp*(n).

Further, two arbitrarily set thresholds dp1 and dp2 are used.

The thresholds dp1 and dp2 are the same number of dimensions as the speed differential value dp_Msp and close to zero, the threshold dp1 is a positive value, and the threshold dp2 is a negative value.

In the present embodiment, for example, the speed state of the motor 10 is classified into an acceleration state, a steady state, or a deceleration state based on the motor speed Msp, the target motor speed Msp*, the speed differential value dp_Msp, or the target speed differential value dp_Msp*. The speed state of the motor 10 is classified into a stationary phase energized state or an energized off state, which will be described later.

The acceleration state is directed to a state in which the motor speed Msp is equal to or less than the target motor speed Msp* or directed to a state in which the speed differential value dp_Msp exceeds the threshold dp1.

The steady state is directed to a state in which the motor speed Msp is more than the target motor speed Msp*, or directed to a state in which the speed differential value dp_Msp is equal to or more than the threshold dp2 and is equal to or less than the threshold dp1.

The deceleration state is directed to a state in which the target speed differential value dp_Msp* is smaller than zero, that is, directed to a state in which the current target motor speed Msp*(n) is less than the previous target motor speed Msp*(n-1). Alternatively, the deceleration state is directed to a state in which the differential value dp_Msp falls below the threshold dp2.

The stationary phase energization state is directed to the speed state of the motor 10 when the control state of the motor 10 is a stationary phase energization control which will be described later.

The energization off state is directed to the speed state of the motor 10 when the control state of the motor 10 is an energization off control which will be described later.

When the speed state of the motor 10 is the steady state or the deceleration state, the FB value setting unit 63 performs a phase advance compensation so that the phase of the motor speed Msp advances, and sets the speed phase advance value Msp_pl as the speed feedback value Msp_fb. The speed phase advance value Msp_pl is also included in the concept of "motor speed".

When the speed state of the motor 10 is the acceleration state, the FB value setting unit 63 does not perform the phase advance compensation, and sets the motor speed Msp to the speed feedback value Msp_fb.

A transfer function for performing the phase advance compensation of the FB value setting unit 63 is expressed by, for example, the following Relational Expressions (2) and (3). Symbols T1 and T2 represent arbitrary constants, and s represents the Laplace operator.

$$(1+T1 \times s)/(1+T2 \times s) \quad (2)$$

$$T1 > T2 \quad (3)$$

The speed deviation computation unit 64 calculates a speed deviation ΔMsp, which is a difference between the target motor speed Msp* and the speed feedback value Msp_fb, and outputs the calculated speed deviation ΔMsp to the controller 65.

The controller 65 performs a P control or a PI control so that the target motor speed Msp* matches the speed feedback value Msp_fb, that is, so that the speed deviation ΔMsp becomes zero.

Further, the controller 65 calculates an FB duty D_fb as a command value of the feedback control. In the feedback control according to the present embodiment, magnitudes of currents and torques flowing through the coils 111 to 113 and 121 to 123 are changed with a change in the duty by the PWM control.

In the present embodiment, the motor 10 is controlled by a rectangular wave control by 120° energization. In the rectangular wave control by 120° energization, the switching element on a high potential side of a first phase and the switching element on a low potential side of a second phase are turned on. In addition, the energization phase is switched by switching the combination of the first phase and the second phase at every electric angle of 60°. As a result, a rotating magnetic field is generated in the winding sets 11 and 12, and the motor 10 rotates.

In the present embodiment, the rotation direction of the motor 10 when the output shaft 15 rotates in the forward rotation direction is defined as a forward direction.

In addition, a duty when the motor 10 outputs a positive torque is assumed to be positive, a duty when the motor 10 outputs a negative torque is assumed to be negative, and an available duty range is assumed to be −100 [%] to 100 [%]. When the motor 10 rotates in the forward direction, the duty is set as positive, and when the motor 10 rotates in the reverse direction, the duty is set as negative.

Since the motor 10 rotating in the forward direction stops, when the braking torque is generated, the rotation direction of the motor 10 is the forward rotation direction, but the duty is negative.

Since the motor 10 reversely rotating stops, when the braking torque is generated, the rotation direction of the motor 10 is the reverse rotation direction, but the duty is positive.

The FF correction value computation unit 66 calculates an FF duty D_ff as a feed-forward term based on the speed state of the motor 10 and the temperature correction coefficient KT.

The FF duty D_ff when the speed state of the motor 10 is the acceleration state is defined as an acceleration FF duty D_fa. The FF duty D_ff when the speed state of the motor 10 is the steady state is set to a steady FF duty D_fi. The FF duty D_ff when the speed state of the motor 10 is the deceleration state is defined as a deceleration FF duty D_fd.

Figure 9:
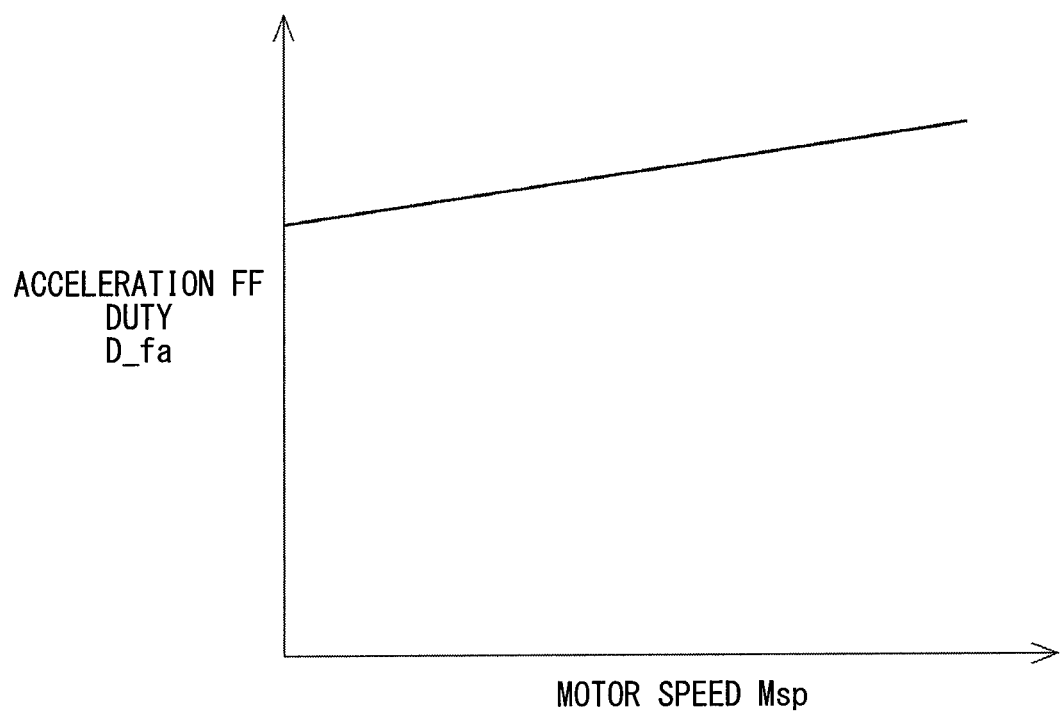
FIG. 9 is a diagram illustrating a relationship among a motor speed, a temperature correction coefficient, and an acceleration feed-forward duty in the shift range control device according to the embodiment.

As shown in FIG. 9, the acceleration FF duty D_fa is calculated based on the relationship diagram and expresses a maximum acceleration duty. The motor speed Msp is corrected to accelerate to a maximum until the motor speed Msp exceeds the target motor speed Msp*. The acceleration FF duty D_fa is not affected by the temperature correction coefficient KT.

Figure 10:
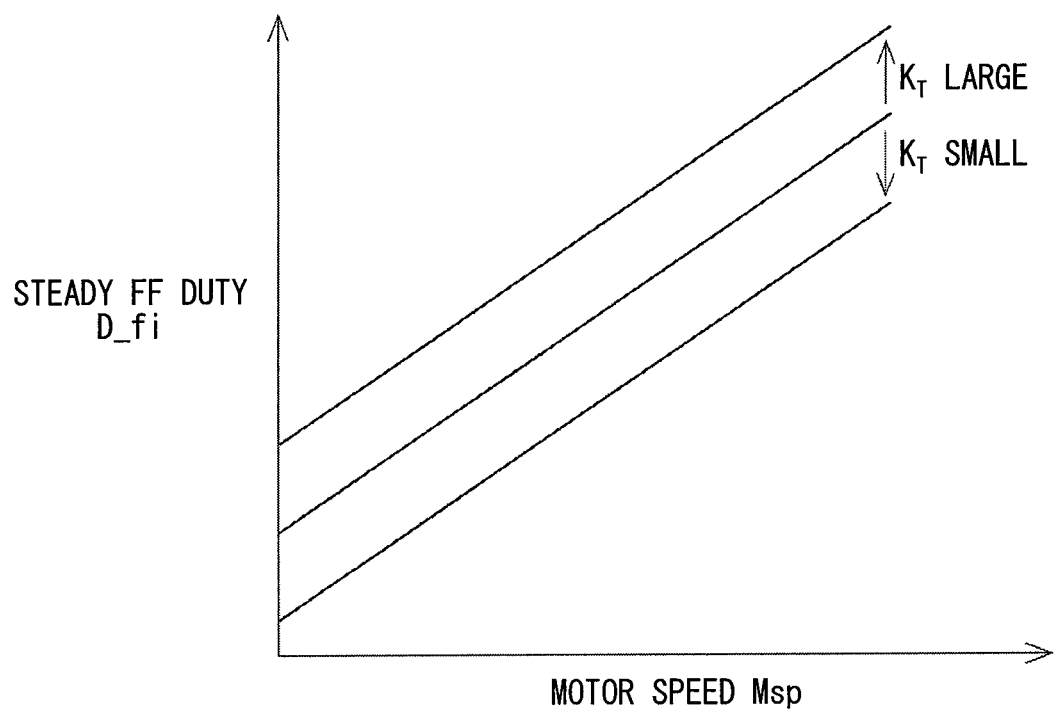
FIG. 10 is a diagram illustrating a relationship among the motor speed, the temperature correction coefficient, and a steady feed-forward duty in the shift range control device according to the embodiment.

As shown in FIG. 10, the steady FF duty D_fi is calculated based on the relationship diagram, and expresses a duty for maintaining the motor speed Msp. The steady FF duty D_fi is a duty that maintains the motor speed Msp at the time of no load.

The steady FF duty D_fi is set to increase as the motor speed Msp or the target motor speed Msp* increases. Further, as the temperature correction coefficient KT increases, the motor temperature Hm decreases, and the motor current Im tends to flow. However, since a friction associated with the driving of the motor 10 is large, the steady FF duty D_fi is set to be large.

Figure 11:
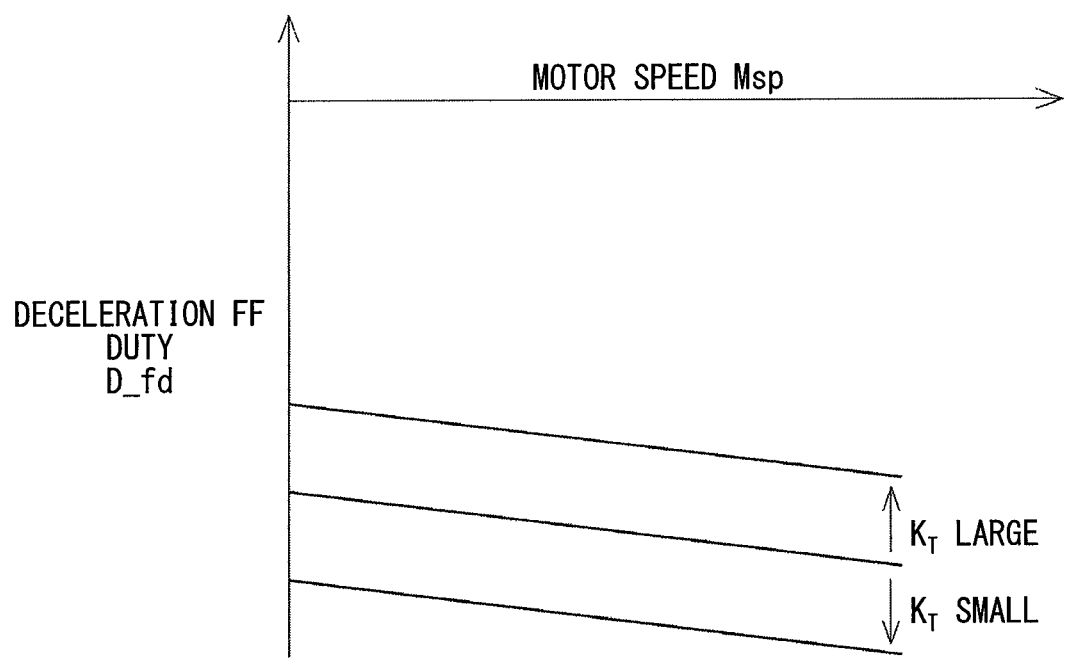
FIG. 11 is a diagram illustrating a relationship among the motor speed, the temperature correction coefficient, and a deceleration feed-forward duty in the shift range control device according to the embodiment.

As shown in FIG. 11, the deceleration FF duty D_fd is calculated on the basis of the relationship diagram, and expresses a duty for correcting the deceleration of the motor speed Msp, which is a negative value. The deceleration FF duty D_fd is a correction duty for realizing the target motor speed Msp*.

As the motor speed Msp increases, an absolute value of the deceleration FF duty D_fd is set to increase. Further, as the temperature correction coefficient KT increases, the motor temperature Hm decreases, the coil resistance Rc decreases, and the motor current Im easily flows, so that the absolute value of the deceleration FF duty D_fd decreases.

In FIG. 9, FIG. 10, and FIG. 11, in the case where the motor 10 rotates in a positive direction, if the motor 10 rotates in a negative direction, the positive and negative values are inverted.

The FF correction value computation unit 66 sets the acceleration FF duty D_fa to the FF duty D_ff when the speed state of the motor 10 is the acceleration state.

The FF correction value computation unit 66 sets the steady FF duty D_fi to the FF duty D_ff when the speed state of the motor 10 is the steady state.

When the speed state of the motor 10 is the deceleration state, the FF correction value computation unit 66 sets the deceleration FF duty D_fd to the FF duty D_ff.

Returning to FIG. 4, the FF correction value computation unit 66 outputs the calculated FF duty D_ff to the FF term correction unit 67.

The FF term correction unit 67 is an integrator, corrects the FB duty D_fb by the FF duty D_ff, integrates the FB duty D_fb, and calculates the duty command value D.

The voltage correction unit 68 corrects the duty command value D based on the battery voltage V. The corrected duty command value D is set as a correction duty command value D_v.

The voltage correction unit 68 outputs the correction duty command value D_v to the PWM signal generation unit 69.

The PWM signal generation unit 69 generates a command signal involved in the switching of the switching elements 411 to 416 and 421 to 426 based on the correction duty command value D_v and the actual count value Cen.

The PWM signal generation unit 69 acquires the motor current Im from the motor drivers 41 and 42, and adjusts the generated command signal so that the motor current Im does not exceed the current limit value Im_max.

Further, the PWM signal generation unit 69 outputs a command signal to the switching control unit 75.

The stationary phase energization control unit 70 performs a stationary phase energization control, which is a control for stopping the rotation of the motor 10, based on the actual count value Cen.

The stationary phase energization control unit 70 selects a stationary phase corresponding to the electric angle, and controls the switching elements 411 to 416 and 421 to 426 so that a current flows in a predetermined direction of the selected stationary phase. As a result, an exciting phase is fixed, and the motor 10 stops at a predetermined electric angle corresponding to the exciting phase.

The stationary phase energization control unit 70 selects the stationary phase and an energization direction based on the actual count value Cen so that the motor 10 stops at a nearest electric angle from the current rotor position.

Further, the stationary phase energization control is performed when the angle deviation e becomes equal to or less than an angle determination threshold e_th. Therefore, it can be considered that the actual count value Cen and the target count value Cen* coincide with each other when the stationary phase energization control is performed. For that reason, the motor 10 stops at the electric angle stoppable at a position closest to the current rotor position so that the motor 10 can be stopped at a position that coincides with the target count value Cen*. Strictly speaking, the electric angle corresponding to the target count value Cen* and the electric angle at which the motor 10 stops under the stationary phase energization control are deviated from each other by the motor resolution at the maximum. However, if a speed reduction ratio of the speed reducer 14 is large, the deviation of the stop position of the output shaft 15 is small, and therefore, the deviation of the electric angle is acceptable.

The switching control unit 75 compares the angle deviation e with the angle determination threshold e_th, and switches the control state of the motor 10 to the feedback control or the stationary phase energization control based on the comparison result.

The switching control unit 75 outputs a drive signal corresponding to the control state to the motor drivers 41 and 42. As a result, the driving of the motor 10 is controlled.

Figure 12:
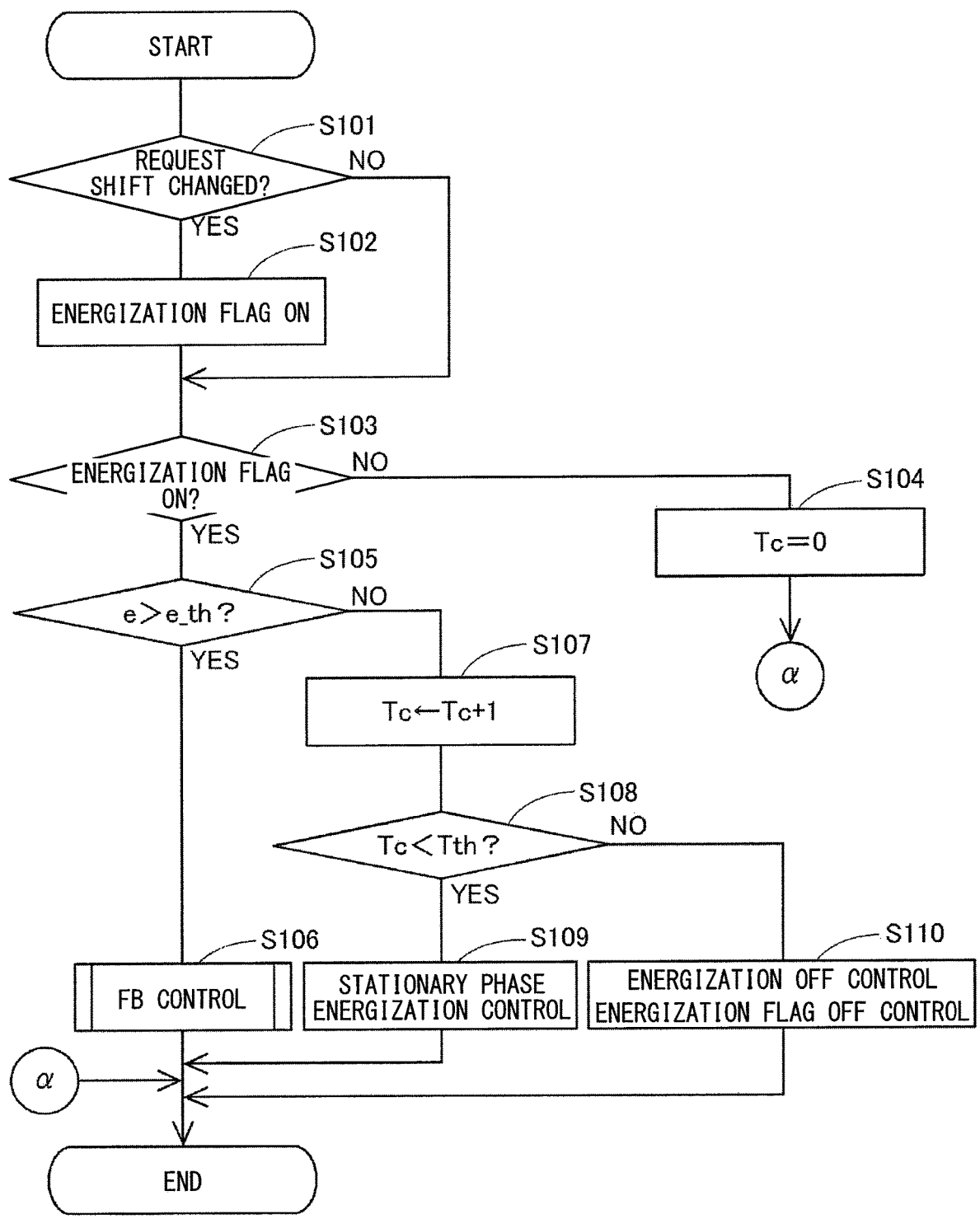
FIG. 12 is a flowchart illustrating the processing of the shift range control device according to the embodiment.

The processing by the shift range control device 40 will be described with reference to a flowchart of FIG. 12. In the flowchart, symbol "S" means a step.

In Step 101, the shift lever is operated by the driver, and the ECU 50 determines whether the driver's request shift range has changed, or not.

If the ECU 50 determines that the driver's request shift range has changed, the process proceeds to Step 102.

On the other hand, when the ECU 50 determines that the driver's request shift range has not changed, the process proceeds to Step 103.

In Step 102, the ECU 50 turns on an energization flag for the motor 10. The on/off processing of the energization flag may be performed by the switching control unit 75, or may be performed separately from the switching control unit 75.

In Step 103, the switching control unit 75 determines whether the energization flag is turned on, or not.

When the switching control unit 75 determines that the energization flag is turned on, the process proceeds to Step 105.

On the other hand, when the switching control unit 75 determines that the energization flag is turned off, the process proceeds to Step 104.

In Step 104, the switching control unit 75 sets a timer value Tc, which will be described later, to reset, that is, Tc=0, and the process is completed.

In Step 105, the switching control unit 75 determines whether the angle deviation e is more than the angle determination threshold e_th, or not. The angle determination threshold e_th is set to, for example, a count number corresponding to a predetermined value close to zero at a mechanical angle of 0.5°.

When the switching control unit 75 determines that the angle deviation e is more than the angle determination threshold e_th, the process proceeds to Step 106.

On the other hand, when the switching control unit 75 determines that the angle deviation e is equal to or less than the angle determination threshold e_th, the process proceeds to Step 107.

In Step 106, the switching control unit 75 sets the control state of the motor 10 to the feedback control.

Figure 13:
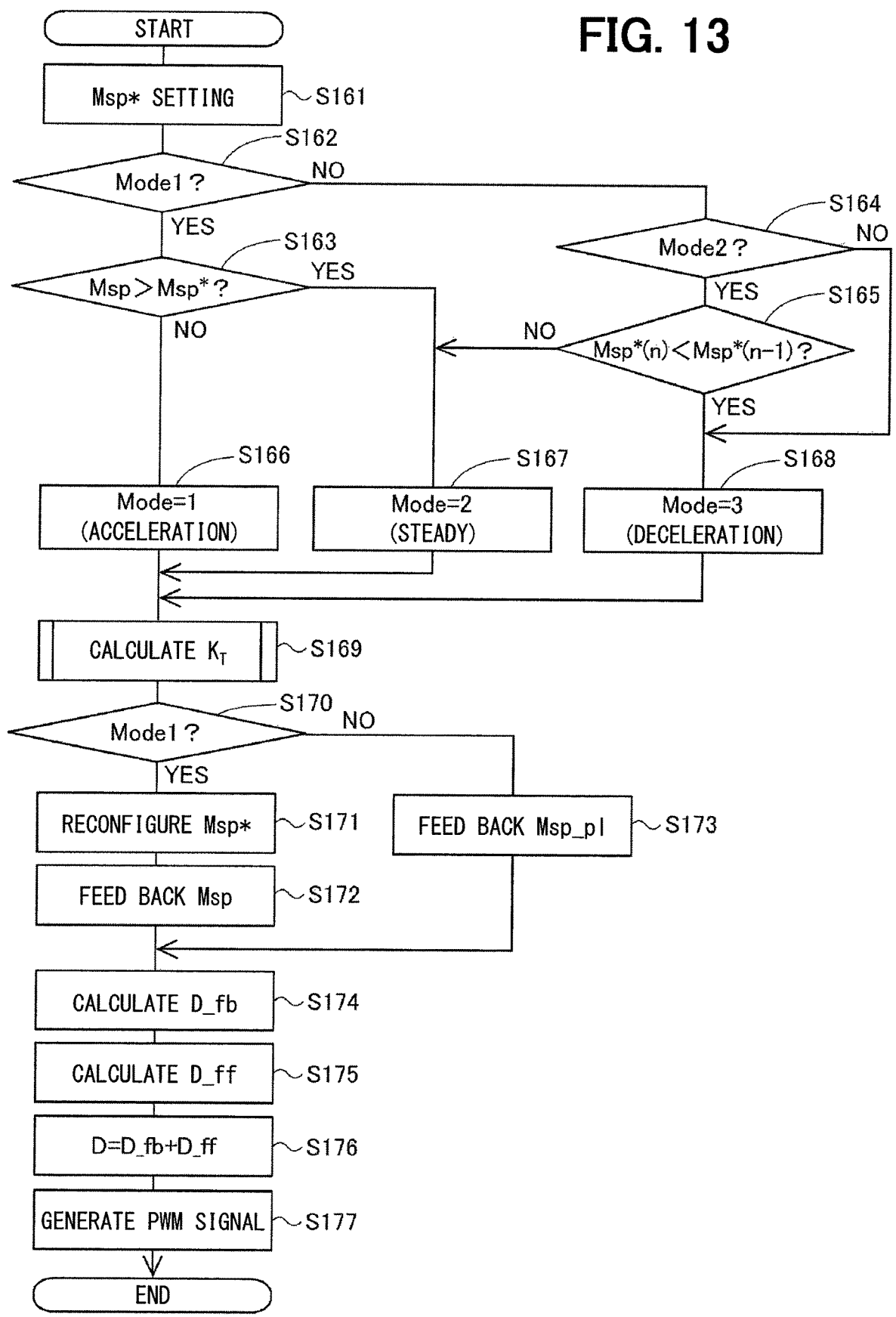
FIG. 13 is a flowchart illustrating a feedback control of the shift range control device according to the embodiment.

The feedback control in Step 106 will be described with reference to a sub-flow in FIG. 13. Immediately after the energization flag is turned on from off, the speed state of the motor 10 is set to the acceleration state. Further, in the drawing, in the speed state of the motor 10, the acceleration state is described as "Mode 1", the steady state is described as "Mode 2", the deceleration state is described as "Mode 3", the stationary phase energization state is described as "Mode 4", and the energization off state is described as "Mode 0".

In Step 161, the target speed setting unit 62 sets the target motor speed Msp* based on the angle deviation e and the battery voltage V.

In Step 162, the FB control unit 60 determines whether the current speed state of the motor 10 is the acceleration state, or not.

If the FB control unit 60 determines that the current speed state of the motor 10 is the acceleration state, the process proceeds to Step 163.

On the other hand, if the FB control unit 60 determines that the current speed state of the motor 10 is not the acceleration state, the process proceeds to Step 164.

In Step 163, the FB control unit 60 determines whether the motor speed Msp is more than the target motor speed Msp*, or not.

If the FB control unit 60 determines that the motor speed Msp is equal to or less than the target motor speed Msp*, the process proceeds to Step 166.

At that time, in Step 166, the FB control unit 60 maintains the speed state of the motor 10 in the acceleration state, and the process proceeds to Step 169.

On the other hand, when the FB control unit 60 determines that the motor speed Msp is more than the target motor speed Msp*, the process proceeds to Step 167.

At that time, in Step 167, the FB control unit 60 switches the speed state of the motor 10 from the acceleration state to the steady state, and the process proceeds to Step 169.

In Step 164, the FB control unit 60 determines whether the current speed state of the motor 10 is the steady state, or not.

If the FB control unit 60 determines that the current speed state of the motor 10 is the steady state, the process proceeds to Step 165.

In Step 165, the FB control unit 60 determines whether the current target motor speed Msp*(n) is less than the previous target motor speed Msp*(n−1), or not.

If the FB control unit 60 determines that the current target motor speed Msp*(n) is equal to or more than the previous target motor speed Msp*(n−1), the process proceeds to Step 167.

At that time, in Step 167, the FB control unit 60 maintains the speed state of the motor 10 in the steady state, and the process proceeds to Step 169.

On the other hand, if the FB control unit 60 determines in Step 164 that the current speed state of the motor 10 is not the steady state, the process proceeds to Step 168.

If the FB control unit 60 determines in Step 165 that the current target motor speed Msp*(n) is less than the previous target motor speed Msp*(n−1), the process proceeds to Step 168.

At that time, in Step 168, the FB control unit 60 switches the speed state of the motor 10 from the steady state to the deceleration state, and the process proceeds to Step 169.

After the processing of Step 166, Step 167 or Step 168, the processing proceeds to Step 169.

In Step 169, the current correction unit 84 calculates the temperature correction coefficient KT according to the motor current Im.

Figure 14:
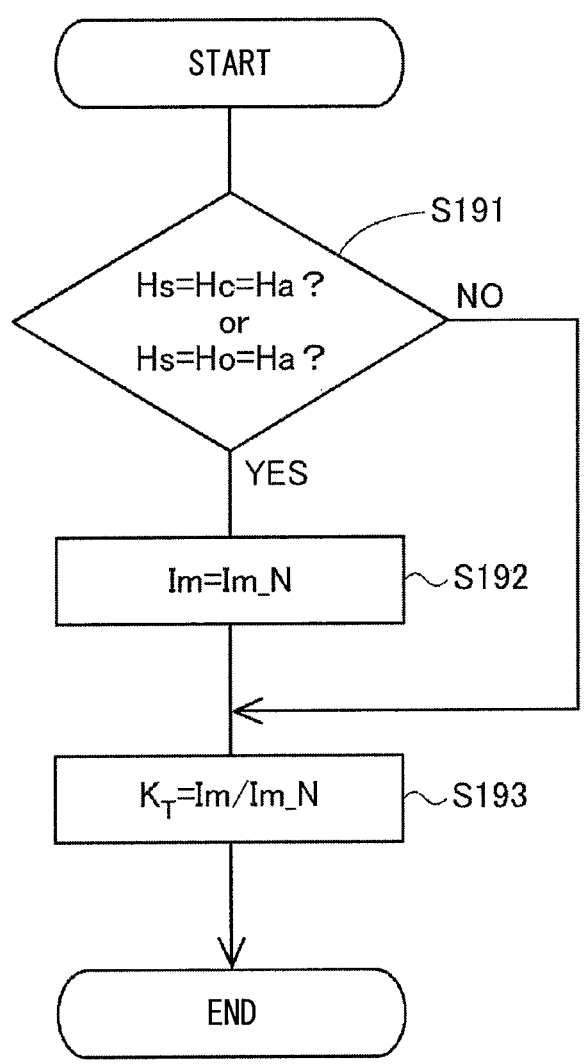
FIG. 14 is a flowchart illustrating calculation of the temperature correction coefficient of the shift range control device according to the embodiment.

The calculation of the temperature correction coefficient KT in Step 169 will be described with reference to a sub-flow of FIG. 14.

In Step 191, the current correction unit 84 determines whether the set temperature Hs, the coolant temperature Hc, and the outside air temperature Ha coincide with each other, or not, or whether the set temperature Hs, the oil temperature Ho, and the outside air temperature Ha coincide with each other, or not. In other words, the current correction unit 84 determines whether the following Relational Expression (4) or (5) is satisfied, or not. In this example, "=" includes a common sense error range.

$$Hs=Hc=Ha \qquad (4)$$

$$Hs=Ho=Ha \qquad (5)$$

If the current correction unit 84 determines that the Relational Expression (4) or (5) is satisfied, the process proceeds to Step 192.

On the other hand, when the current correction unit 84 determines that the Relational Expression (4) or (5) is not satisfied, the process proceeds to Step 193.

In Step 192, the current correction unit 84 sets the acquired motor current Im as the normalized motor current Im_N. The current correction unit 84 stores that state in a RAM or the like, and the process proceeds to Step 193.

In Step 193, the current correction unit 84 calculates the temperature correction coefficient KT with the use of the acquired motor current Im and the normalized motor current Im_N, and the process proceeds to Step 170. If the Relational Expression (4) or (5) is satisfied, the temperature correction coefficient KT becomes 1.

In Step 170, the FB control unit 60 determines whether the speed state of the motor 10 is the acceleration state, or not.

When the FB control unit 60 determines that the speed state of the motor 10 is the acceleration state, the process proceeds to Step 171.

On the other hand, when the FB control unit 60 determines that the speed state of the motor 10 is not the acceleration state, that is, the speed state of the motor 10 is the steady state or the deceleration state, the process proceeds to Step 173.

In Step 171, the current correction unit 84 corrects the angle deviation e based on the temperature correction coefficient KT. With the use of the corrected angle deviation e, the target speed setting unit 62 resets the target motor speed Msp*, and the process proceeds to Step 172.

In Step 172, the FB value setting unit 63 outputs the motor speed Msp as the speed feedback value Msp_fb to the speed deviation computation unit 64.

The speed deviation computation unit 64 calculates a speed deviation ΔMsp between the target motor speed Msp* and the speed feedback value Msp_fb set by the FB value setting unit 63, and the process proceeds to Step 174.

In Step 173, the FB value setting unit 63 outputs the phase advance compensation value Msp_pl as the speed feedback value Msp_fb to the speed deviation computation unit 64.

The speed deviation computation unit 64 calculates a speed deviation ΔMsp between the target motor speed Msp* and the speed feedback value Msp_fb set by the FB value setting unit 63, and the process proceeds to Step 174.

In Step 174, the controller 65 calculates the FB duty D_fb, outputs the calculated FB duty D_fb to the FF term correction unit 67, and the process proceeds to Step 175.

In Step 175, the FF correction value computation unit 66 calculates the FF duty D_ff based on the speed state of the motor 10 and the temperature correction coefficient KT, outputs the calculated FF duty D_ff to the FF term correction unit 67, and the process proceeds to Step 176.

In Step 176, the FF term correction unit 67 integrates the FB duty D_fb and the FF duty D_ff to calculate the duty command value D, and the process proceeds to Step 177.

In Step 177, the voltage correction unit 68 corrects the duty command value D based on the battery voltage V. The PWM signal generation unit 69 generates a PWM signal based on the correction duty command value D_v. The motor 10 is controlled by turning on and off the switching elements 411 to 416 and 421 to 426 based on the generated PWM signal.

After the process of Step 177, the process is completed.

Returning to FIG. 12, in Step 105, when the switching control unit 75 determines that the angle deviation e is equal to or less than the angle determination threshold e_th, the process proceeds to Step 107.

In Step 107, the switching control unit 75 counts a timer value Tc, which is a count value of a timer for counting a duration time of the stationary phase energization control, and the process proceeds to Step 108.

In Step 108, the switching control unit 75 determines whether the timer value Tc is less than a duration determination threshold Tth, or not.

The duration determination threshold Tth is set to, for example, 100 ms, and is a value set according to an energization continuation time Ta for continuing the stationary phase energization control.

When the switching control unit 75 determines that the timer value Tc is less than the duration determination threshold Tth, the process proceeds to Step 109.

On the other hand, when the switching control unit 75 determines that the timer value Tc is equal to or more than the duration determination threshold Tth, the process proceeds to Step 110.

In Step 109, the switching control unit 75 switches the control state of the motor 10 to the stationary phase energization control, and the process is completed.

In Step 110, the switching control unit 75 switches the control state of the motor 10 to the energization-off control, and the process is completed.

In the energization off control, the switching control unit 75 outputs a signal for turning off all of the switching elements 411 to 416 and 421 to 426 of the motor drivers 41 and 42 to the motor drivers 41 and 42. The signal causes the switching elements 411 to 416 and 421 to 426 to turn off. As a result, in the energization off control, an electric power is not supplied to the motor 10 side.

Since the motor relays 46 and 47 continue to be turned on while the start switch is turned on, the motor relays 46 and 47 are turned on even during the energization off control.

The ECU 50 also turns off the energization flag.

The processing by the shift range control device 40 will be described with reference to a time chart of FIG. 15.

Figure 15:
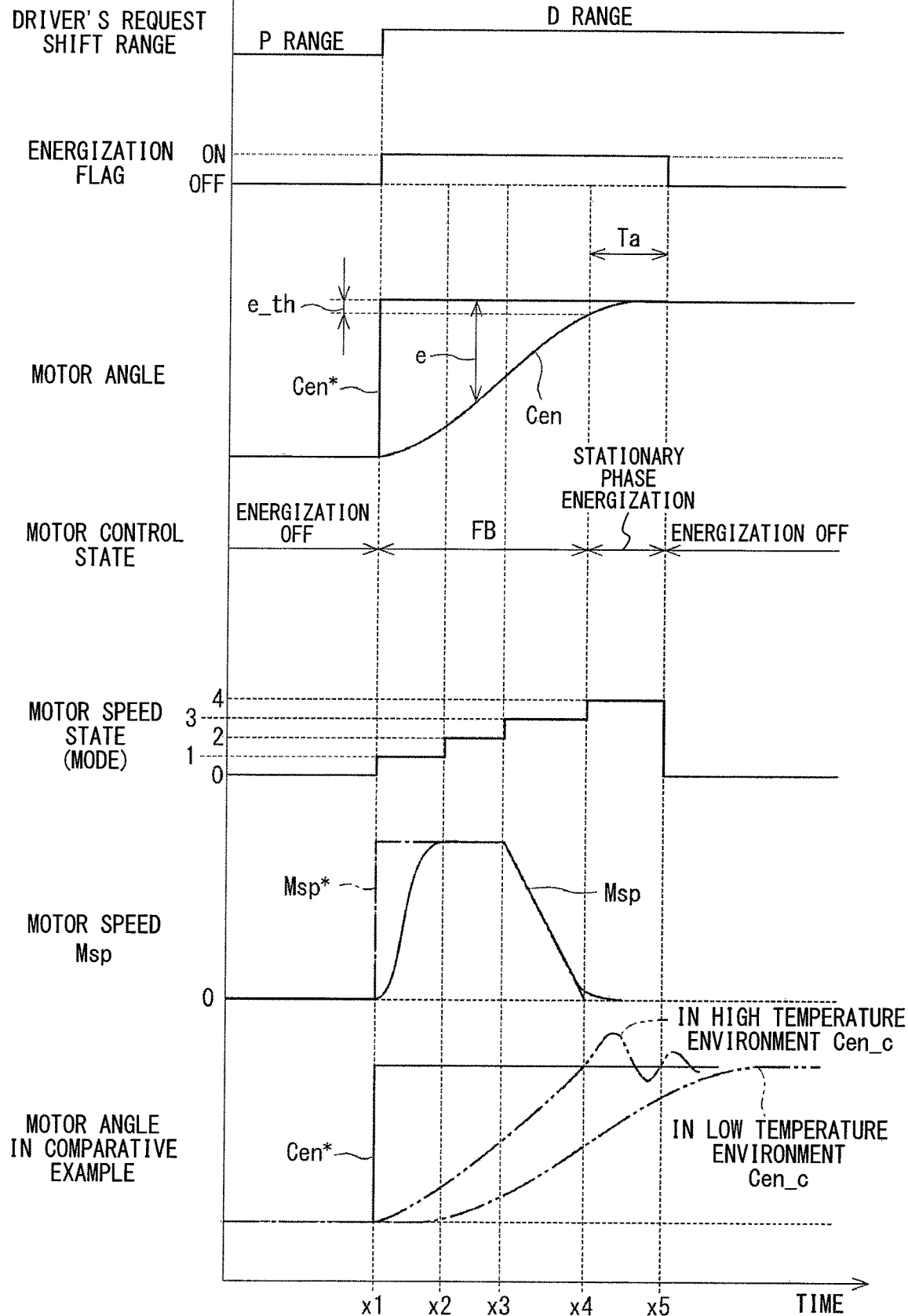
FIG. 15 is a time chart illustrating processing of the shift range control device according to the embodiment.

FIG. 15 shows the driver's request shift range, the energization flag, the angle of the motor 10, and the control state of the motor 10 from the top, with a common time axis as the horizontal axis. The angle of the motor 10 is represented by a count value of the encoder 13.

FIG. 15 shows the speed state of the motor 10 and the motor speed Msp.

As shown in FIG. 15, when the driver's request shift range is maintained in the P range before a time x1, the control state of the motor 10 is set to the energization off control.

At the time x1, when the driver's request shift range changes from the P range to the D range, the energization flag is switched from OFF to ON.

A target count value Cen* corresponding to the driver's request shift range is set, and the angle deviation computation unit 61 calculates the angle deviation e.

The angle deviation e is more than the angle determination threshold e_th, and the switching control unit 75 switches the control state of the motor 10 from the energization off control to the feedback control. In addition, the FB control unit 60 determines that the speed state of the motor 10 is the acceleration state.

At the time x1, the current correction unit 84 corrects the angle deviation e based on the temperature correction coefficient KT.

The target speed setting unit 62 sets the target motor speed Msp* based on the corrected angle deviation e and the battery voltage V. In FIG. 15, the target motor speed Msp* is indicated by a dash-dot line. The motor speed Msp starts to increase so that the motor speed Msp becomes the target motor speed Msp*.

At a time x2, the motor speed Msp becomes more than the target motor speed Msp*, and the FB control unit 60 switches the speed state of the motor 10 from the acceleration state to the steady state. The motor speed Msp is maintained at a constant value along the target motor speed Msp*.

At a time x3, the current target motor speed Msp*(n) becomes less than the previous target motor speed Msp*(n−1), and the FB control unit 60 switches the speed state of the motor 10 from the steady state to the deceleration state. The motor speed Msp is reduced to zero.

In the shift range control device 40 according to the present embodiment, when the speed state of the motor 10 is the steady state or the deceleration state, the FB value setting unit 63 sets the phase advance compensation value Msp_pl as a speed feedback value Msp_fb. The speed signal is prefetched and fed back to prevent hunting. For that reason, the motor speed Msp coincides with the target motor speed Msp* during a period from the time x3 until the motor 10 is decelerated, and the motor speed Msp decelerates with stable behavior. This makes it possible to stably control the driving of the motor 10.

At a time x4, the angle deviation e becomes equal to or less than the angle determination threshold e_th, and the switching control unit 75 switches the control state of the motor 10 from the feedback control to the stationary phase energization control. The motor 10 can be stopped quickly by the stationary phase energization.

During a period from the time x4 to a time x5 at which the energization continuation time Ta elapses, the stationary phase energization control is continued. As a result, hunting or the like is prevented and the motor 10 can be reliably stopped, so that the detent roller 26 can be reliably fitted into the desired recess portions 22.

In FIG. 15, as a comparative example, a motor angle Cen_c in the case where the motor is used in a high temperature environment or a low temperature environment is indicated by two-dot chain lines.

When a motor is used in the high temperature environment, a coil resistance of the motor is large, a flowing current is small, a braking force is lowered, and the motor angle Cen_c may overshoot.

On the other hand, when the motor is used in the low temperature environment, a friction due to the driving of the motor becomes large, a responsiveness deteriorates, and a time required for the motor angle Cen_c to reach the target angle may become long.

Therefore, in the present embodiment, the temperature correction coefficient KT is calculated according to the motor current Im, and the current correction unit 84 corrects the angle deviation e based on the temperature correction coefficient KT. The angle deviation e is corrected to correct the target motor angle Msp*. As a result, the braking timing of the motor 10 can be advanced in the high temperature environment, and overshoot is prevented. Further, in the low temperature environment, the braking timing of the motor 10 can be delayed, and a time at which the actual count value Cen reaches the target count value Cen* is appropriate.

Therefore, the actual count value Cen according to the present embodiment reaches the target count value Cen* with excellent responsiveness without overshooting according to the temperature.

At the time x5, the switching control unit 75 switches the control state of the motor 10 from the stationary phase energization control to the energization off control, and the energization flag is turned off. The off state of the energization flag is continued until the driver's request shift range is changed again. The control state of the motor 10 is continued by the energization-off control. As a result, since the motor 10 is not energized except when the shift range is switched, a power consumption is reduced as compared with the case where the energization is continued.

Incidentally, in FIG. 15, an example in which the driver's request shift range is switched from the P range to the D range has been described, but the same applies to the control at the time of other range switching.

Other Embodiments (i) In the above embodiment, the motor is a three-phase brushless motor of a permanent magnet type. In other embodiments, the motor may be any motor capable of switching between feedback control and stationary phase energization control. In the above embodiment, the motor is provided with two winding sets. In other embodiments, the number of the winding sets of the motor may be one or three or more.

(ii) In the embodiment described above, in the feedback control, the rectangular wave control by the 120° energization is performed. In another embodiment, in the feedback control, the rectangular wave control may be performed by energization at 180°. Further, the present disclosure is not limited to the rectangular wave control, and the PWM control may be performed by a triangular wave comparison method or an instantaneous vector selection method.

(iii) In the above embodiment, the encoder is used as the rotation angle sensor for detecting the rotation angle of the motor. In other embodiments, the rotation angle sensor is not limited to the encoder, and any sensor such as a resolver may be used. The feedback control may be performed with the use of the rotation angle per se of the motor or a value other than the encoder count value that can be converted into the rotation angle of the motor. The same applies to the selection of the stationary phase in the stationary phase energization control.

(iv) In the embodiment described above, the detent plate is provided with four recess portions. In other embodiments, the number of recess portions is not limited to four and may be any number. For example, two recess portions of the detent plate may be used to switch between the P range and the notP range. The shift range switching mechanism, the parking lock mechanism, and the like may be different from those of the above embodiment.

(v) In the above embodiment, the liquid temperature sensor can measure the temperature of the coolant used for the radiator. The liquid temperature sensor may measure a temperature of a coolant that cools a voltage converter mounted on the vehicle. The current correction unit may calculate the temperature correction coefficient KT with the use of the temperature of the coolant for cooling the voltage converter instead of the temperature of the coolant used for the radiator.

As described above, the present disclosure is not limited to such embodiments, and can be implemented in various forms without departing from the spirit thereof.

The present disclosure has been described in accordance with the embodiments. However, the present disclosure is not limited to the above embodiments and structures. The present disclosure also encompasses various modifications and variations within the scope of equivalents. Also, various combinations and forms, as well as other combinations and forms that include only one element, more, or less, fall within the scope and spirit of the present disclosure.

The invention claimed is:

1. A shift range control device mounted on a vehicle for switching a shift range by controlling a driving operation of a motor, the shift range control device comprising:
   a feedback controller that performs a feedback control based on an actual angle of the motor and a motor speed which is a rotational speed of the motor;
   a feedback value setting unit that sets a feedback value of the motor speed to advance a phase of the motor speed, based on the motor speed;
   a current sensor that detects a motor current which flows through the motor; and
   a current correction unit that corrects a target motor speed which is a target speed of the motor determined based on a request shift range, wherein:
   a temperature of a coolant used in the vehicle is defined as a coolant temperature;
   a temperature of an oil used in the vehicle is defined as an oil temperature;
   a temperature of an outside air is defined as an outside air temperature;
   the motor current, which is set based on a set temperature as a preliminarily set temperature, is defined as a normalized motor current;
   the current correction unit corrects the motor current to be the normalized motor current when at least one of the coolant temperature, the oil temperature and the outside air temperature coincides with the set temperature; and
   the current correction unit estimates a temperature of the motor based on the motor current and the normalized motor current.

2. The shift range control device according to claim 1, wherein:
   the current correction unit corrects the target motor speed when the motor speed accelerates.

3. The shift range control device according to claim 1, further comprising:
   a feed-forward term correction unit that corrects a command value calculated by the feedback control unit, based on the motor speed or the target motor speed, wherein:
   the feed-forward term correction unit corrects the command value based on the motor current when the motor speed is constant or when the motor speed decreases.

4. The shift range control device according to claim 1, wherein:
   the feedback control unit includes:
   a target speed setting unit that sets the target motor speed based on an angle deviation which is a difference between a target angle of the motor determined based on the request shift range and the actual angle of the motor; and
   a controller that calculates a command value for reaching the motor speed to be the target speed;

the current correction unit estimates a temperature of the motor based on the motor current, and corrects the angle deviation; and the target speed setting unit sets the target motor speed based on the angle deviation corrected by the current correction unit.

5. The shift range control device according to claim 1, further comprising:

a stationary phase energization control unit that performs a stationary phase energization control for energizing a stationary phase selected based on an actual angle of the motor; and a switching control unit that switches the control of the motor to the feedback control when the request shift range switches to another range, and switches the control of the motor from the feedback control to the stationary phase energization control when a difference between a target angle of the motor determined based on the request shift range and the actual angle of the motor becomes equal to or less than an angle determination threshold, wherein:

the switching control unit continues the stationary phase energization control until an energization continuation time elapses after switching to the stationary phase energization control; and the switching control unit switches the control of the motor from the stationary phase energization control to an energization off control for cutting off the energization to the motor when the energization continuation time elapses after switching to the stationary phase energization control.

* * * * *